(12) United States Patent
Lee

(10) Patent No.: US 8,102,556 B2
(45) Date of Patent: *Jan. 24, 2012

(54) CONTROLLING A CONFIGURATION OF AN IMAGE FORMING APPARATUS USING A JAVA APPLICATION

(75) Inventor: Kanghoon Lee, Fremont, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/100,760

(22) Filed: May 4, 2011

(65) Prior Publication Data

US 2011/0205574 A1 Aug. 25, 2011

Related U.S. Application Data

(60) Continuation of application No. 12/768,026, filed on Apr. 27, 2010, now Pat. No. 7,952,744, which is a continuation of application No. 10/684,429, filed on Oct. 15, 2003, now Pat. No. 7,755,785, which is a division of application No. 10/625,509, filed on Jul. 24, 2003, now Pat. No. 7,508,533, which is a division of application No. 08/856,183, filed on May 14, 1997, now Pat. No. 6,628,413.

(60) Provisional application No. 60/017,398, filed on May 14, 1996.

(51) Int. Cl.
*G06F 3/12* (2006.01)
*G06K 15/00* (2006.01)

(52) U.S. Cl. ........................................ 358/1.15; 358/1.1

(58) Field of Classification Search ................. 358/1.1, 358/1.8, 1.9, 1.12, 1.13, 1.14, 1.15, 1.18, 358/400, 448; 709/201, 203, 217, 220
See application file for complete search history.

(56) References Cited

U.S. PATENT DOCUMENTS

| | | | |
|---|---|---|---|
| 4,642,792 A | 2/1987 | Clements et al. | 358/1.18 |
| 5,075,874 A | 12/1991 | Steeves et al. | 258/1.13 |
| 5,121,113 A | 6/1992 | Kedge et al. | 345/168 |
| 5,165,014 A | 11/1992 | Vassar | 358/1.13 |
| 5,228,118 A | 7/1993 | Sasaki | 358/1.13 |
| 5,293,466 A | 3/1994 | Bringman | 358/1.15 |
| 5,323,393 A | 6/1994 | Barrett et al. | 370/449 |
| 5,371,837 A | 12/1994 | Kimber | 358/1.15 |
| 5,455,599 A | 10/1995 | Cabral et al. | 345/440 |

(Continued)

FOREIGN PATENT DOCUMENTS

JP 64-008080 1/1989

(Continued)

OTHER PUBLICATIONS

Larsen, Amy K.; "The Next Web Wave: Network Management", Jan. 1996, pp. 1-3; Data Communications.

(Continued)

*Primary Examiner* — Gabriel Garcia

(74) *Attorney, Agent, or Firm* — Oblon, Spivak, McClelland, Maier & Neustadt, L.L.P.

(57) ABSTRACT

A method and system for printing documents based on Java commands. A Java printer receives page layout requests and converts the requests into a rasterized image which is transferred to a recording medium. Page layout can be interactively modified. The Java printer also monitors print requests and is configurable using a World Wide Web interface.

15 Claims, 6 Drawing Sheets

U.S. PATENT DOCUMENTS

| | | | | |
|---|---|---|---|---|
| 5,469,373 | A | 11/1995 | Kashiwazaki et al. | 702/127 |
| 5,488,223 | A | 1/1996 | Austin et al. | 235/375 |
| 5,495,561 | A | 2/1996 | Holt | 358/1.15 |
| 5,537,626 | A | 7/1996 | Kraslavsky et al. | 710/8 |
| 5,566,278 | A | 10/1996 | Patel et al. | 358/1.15 |
| 5,638,497 | A | 6/1997 | Kimber et al. | 358/1.15 |
| 5,699,494 | A | 12/1997 | Colbert et al. | 358/1.15 |
| 5,784,553 | A | 7/1998 | Kolawa et al. | 714/38 |
| 5,784,622 | A | 7/1998 | Kalwitz et al. | 710/200 |
| 5,790,855 | A | 8/1998 | Faustine | 717/100 |
| 5,828,840 | A | 10/1998 | Cowan et al. | 709/203 |
| 5,956,487 | A | 9/1999 | Venkatraman et al. | 709/218 |
| 6,003,065 | A | 12/1999 | Yan et al. | 709/201 |
| 6,139,177 | A | 10/2000 | Venkatraman et al. | 700/83 |
| 6,170,007 | B1 | 1/2001 | Venkatraman et al. | 709/218 |
| 6,314,521 | B1 | 11/2001 | Debry | 726/10 |
| 6,321,266 | B1 | 11/2001 | Yokomizo et al. | 709/226 |
| 6,628,413 | B1 | 9/2003 | Lee | 358/1.15 |
| 7,508,533 | B2 | 3/2009 | Lee | 358/1.13 |
| 7,952,744 | B2 * | 5/2011 | Lee | 358/1.15 |
| 2002/0078160 | A1 | 6/2002 | Kemp et al. | 709/208 |
| 2003/0043272 | A1 | 3/2003 | Nagao et al. | 348/207.1 |

FOREIGN PATENT DOCUMENTS

| | | |
|---|---|---|
| JP | 01-204768 | 8/1989 |
| JP | 03-237525 | 10/1991 |
| JP | 03-262674 | 11/1991 |
| JP | 04-231604 | 8/1992 |
| JP | 05-122424 | 5/1993 |
| JP | 05-198926 | 8/1993 |
| JP | 05-221090 | 8/1993 |
| JP | 06-187334 | 7/1994 |
| JP | 06-243081 | 9/1994 |
| JP | 06-348436 | 12/1994 |
| JP | 08-065982 | 3/1996 |
| JP | 08-071799 | 3/1996 |
| JP | 08-077650 | 3/1996 |
| JP | 08-078023 | 3/1996 |
| JP | 08-090846 | 4/1996 |
| JP | 08-115180 | 5/1996 |
| JP | 08-175067 | 7/1996 |
| JP | 08-309020 | 11/1996 |
| JP | 08-337185 | 12/1996 |
| JP | 09-077166 | 3/1997 |
| JP | 09-087010 | 3/1997 |
| JP | 09-223096 | 8/1997 |
| JP | 09-0230537 | 9/1997 |
| JP | 09-280373 | 10/1997 |
| JP | 09-284515 | 10/1997 |
| WO | WO 96/01456 | 1/1996 |

OTHER PUBLICATIONS

Goldberg, Ken, et al.; "Desktop Teleoperation via the World Wide Web", IEEE International Conference on Robotics and Automation, May 19-26, 1995, Nagoya, Japan, pp. 1-6.

Goldberg, Ken, et al.; "A Tele-Robotic Gardan on the World Wide Web", http://telegarden.aec.at/, pp. 1-2.

Goldberg, Ken, et al.; "Beyond the Web: Excavating the Real World Via Mosaic", Second International WWW Conference, Chicago, IL, Oct. 17-21, 1994, pp. 1-15.

Osborn, Joe, Dialog (R) File 621:IAC, two pages, Mar. 1, 1991, "Jandel Scientific Annouces JABA (R) 1.4".

Evans, Leslie, Dialog (R) File 621:IAC, two pages, Dec. 2, 1996, "Bristol Technology Unveils First Cross-Platform Java Printing Solution".

Lazaroff, Peter; Dialog (R) File 621:IAC, three pages, Feb. 10, 1997, "Repeat/IBM Introduces Industry's First Java Application for Intranet Printer Management".

Cox, John; Network World, vol. 13, No. 13, p. 41(2), Mar. 25, 1996, "Printer Presses Forward With Java Application".

Computergram Internation, No. 3097, Pcgn02110008, Feb. 11, 1997, "IBM Re-Writes Printer Management Software in Java".

The Java Language Specification (Java.sun.com, pages labeled 1-11, copyright 1995).

Stanek, William; "HTML Java CGI VRML SGML web publishing unleased, pp. 651-674", 1996.

Betran, et al.; "Print Rasterization Moves Hostward with Support From SCSI", Computer Technology Review, May 12, 1992, No. 6, Los Angeles, CA U.S.A.

Goldberg, Ken, et al.; "Beyond the Web:manipulating the real world"; 1995, computer Networks and ISDN Systems, pp. 209-219, vol. 28.

Toth, Viktor; "Visual C++4 Unleashed"; Jan. 19, 2001; pp. 1-2; http://www.amazon.comexec/obldos/tg/detail/-/0672308746/ref=olp_product_details/102-71.

Tektronix; "Phaser 550 Color Laser Printer—color and monochrome laser printing for your workgroup."; Apr. 1996, pp. 1-2.

Tektronix; Phaser 550 Color Laser Printer—Ordering Information; Apr. 1996; pp. 1.

IBM Technical Disclosure Bulletin; "Disk Drive with Embedded Hyper-Text Markup Language Server", Dec. 1995, p. 479; vol. 38, No. 12; XP 000588211.

Observer; "New Sun 'Java' Embedded Chips Targeted at Printer Market"; Mar. 1996, pp. 22-23.

Tektronix; "User Manuel for Phaser 550 Color Printer"; Feb. 1996; pp. 1-224.

Nikkei Electronics; "WWW's Operation model changes"; Jan. 1, 1996, p. 1-1, Toshio Furuhata New Year Special Issue.

Topic related to the Internet—Mechanism of WWW—TRONWARE, Personal Media, Jun. 10, 1995, pp. 68 to 79, vol. 6; No. 3, Japan.

Kuzuoka, Hideaki; "Study on Real World Wide Web"; Apr. 26, 1996, p. 1; Institute of Engineering Mechanics University of Tsukuba, Group Ware 17-3.

Furuhata, Toshio; Nikkei Electronics, "www's operation model changes", New Year Special Issue, Jan. 1, 1996, pp. (6), (with partial English translation).

"Topic related to the Internet-Mechanism of WWW-, TRONWARE", Personal Media, Jun. 10, 1995, pp. 68 to 79, vol. 6, No. 3, Japan, pp. (13), (with partial English translation).

Kuzuoka, Hideaki; "Study on Real World Wide Web", Institute of Engineering Mechanics University of Tsukuba, Group Ware 17-3, Apr. 26, 1996 pp. (7), (with partial English translation).

* cited by examiner

```
                                                    122
                           ┌────────────────────────┴──────────────────────┐
                           │ ▭      Printer Configuration         ▽   △    │
124                        ├───────────────────────────────────────────────┤
   ╲ ┌─File  Edit  Option 1  Option 2  Option 3              Help─┐  120
     │ ┌────┬─────┬────┬──────┬────┬─────┬───────┐                │
126 ┌│ │ ←  │  →  │Home│Reload│Open│Print│ Stop  │                │
    ╲│ │Back│Forwd│    │      │    │     │Loading│                │
     │ └────┴─────┴────┴──────┴────┴─────┴───────┘                │
     │ Document ID: │http:// printer 1. Companyname. Com/Configure│─128
     │              └──────────────────────────────────────────────┘
     │   Select Default Printer Configuration  130
     │                                    ┌────┴──────────┐ ┌──┐
     │   Configuration for uses at:       │ 255. 255. 255.0│ │⊥│
     │                                    └───────────────┘ └──┘
     │   Paper Size
     │   ⊙A4      ○8 1/2 x 11     ○ Legal
     │
     │   Tray
     │   ○Upper        ⊙ Lower
     │
     │   Lines Per Page:  │ 60 │
 131<│
     │
     │   Image Type:
     │   ⊙ Color      ○B/W        ○ Greyscale
     │   Maximum Job Size: │<Unlimited>│
     │   Billing Code: │Accounting Dept│
     │
     │   Other Restrictions:
     │   ⊠ Work hours only  ☐ Restriction #2
     │   ⊠ High Priority
     │
     │
     │               Or, if you need help, press Help.
     └──────────────────────────────────────────────────┘ 134

FIG. 3
```

```
<HTML>
<HEAD>
<TITLE> QUEUE MANAGER </TITLE>
</HEAD>
<BODY>
<APPLET Code="QueueMgr.Class" width=500 height=300>
</APPLET>
</BODY>
</HTML>
```

*FIG. 7*

```
public class Letterhead extends Printer {
protected     String         page_1_text;
protected     String         page_2_text;
protected     int            p1x,p1y, p2x, p2y;
public        setPage1Text (String s1)   {page_1_text = s1;}
public        set Page2Text (String s2)  {page_2_text = s2;}
public        drawPage (int page_number)
   if (page_number = =1)
   {drawString (p1x, p1y, page_1_text); super.drawPage (page_number);}
   else
   {drawString(p2x, p2y, page_2_text); super.drawPage (page_number);}
   }
   :
   // other definitions of methods or data members
   }
```

*FIG. 8*

CONTROLLING A CONFIGURATION OF AN IMAGE FORMING APPARATUS USING A JAVA APPLICATION

CROSS-REFERENCE TO RELATED APPLICATIONS

This application is a continuation of and is based upon and claims the benefit of priority under 35 U.S.C. §120 from U.S. Ser. No. 12/768,026, filed Apr. 27, 2010 now U.S. Pat. No. 7,952,744, which is a continuation of U.S. Ser. No. 10/684,429 (now U.S. Pat. No. 7,755,785), filed Oct. 15, 2003, which is a divisional of U.S. Ser. No. 10/625,509 (now U.S. Pat. No. 7,508,533), filed Jul. 24, 2003, which is a divisional of U.S. Ser. No. 08/856,183 (now U.S. Pat. No. 6,628,413), filed May 14, 1997, which claims the benefit of priority to provisional U.S. Ser. No. 60/017,398, filed May 14, 1996 the entire contents of each of which of these applications are incorporated herein by reference in their entirety.

BACKGROUND OF THE INVENTION

1. Field of the Invention

This invention relates to a printer or printer system using the Java language to control rasterizing an image and to control printing.

2. Description of the Background

The Internet is undergoing explosive growth and many new technologies are being developed to keep up with this growth. Previously, in order to develop applications quickly, application developers sought to use specialized cross-platform application development techniques which create applications for multiple hardware and software platforms. For example, operating systems (i.e. Solaris, Windows 95, Windows 3.x, OS/2 and Unix) create applications and executable files differently and have been implemented on various processor types (Intel processors, 680.times.0, Power PCs, and Sun SPARCS). To develop applications for all permutations of operating systems and hardware is difficult and extends the product development cycle. To make cross-platform development faster and easier, Sun Microsystems developed a language called Java which is object-oriented but simple. Java is described in Java in a Nutshell: A Desktop Quick Reference for Java Programmers by David Flannagan, published by O'Reilly & Associates, Inc., as well as in the Sun Series of books published by Prentice Hall Books entitled Core Java, Instant Java, Java by Example, and Just Java by Cornell, Pew, Jackson and Van Der Linden, respectively, which are incorporated herein by reference. One of Java's advantages is that it is a portable language which is independent of operating systems and hardware architectures. Further, applications developed using Java are adaptable or extendable using Java's ability to download new classes dynamically and to add the downloaded classes to an existing class hierarchy. Java also provides the advantages of distribution, language interpretation, security, high performance and a multi-threaded implementation.

Java enables applications to be written using an extensible set of objects, with each set of objects being defined in a separate group of objects called a package. The core set of objects for Java are defined in the java.lang package and describe the most central characteristics of the Java language. One of Java's advantages is that the character type that Java uses is the Unicode standard which allows English and Asian characters to be represented consistently and together in applications or documents generated using Java.

Other languages have been used to represent the layout of documents as they appear on printers. PostScript by Adobe is an extendable page-layout language which supports text and graphics on the same page. Some aspects of PostScript are described in PostScript by Example by Henry McGilton and Mary Campione, published by Addison-Wesley Publishing Company, the contents of which are incorporated herein by reference. PostScript uses stacks and dictionaries to extend the language. Some PostScript printers also have been equipped with non-volatile memories which are used to store configuration information for the printers. However, PostScript's lack of strong security features has enabled malicious users of the printer to update the parameters stored in the non-volatile memory, thereby disturbing the printer's use in network environments.

Other printer languages, such as PCL by Hewlett-Packard, have evolved from uni-directional, dot-matrix line printers and therefore lack many of the operators needed to control the placement of images on a page. PCL also lacks modularity. The macros defined by PCL use globally scoped variables that can affect the performance of other macros defined by the language.

Currently, all of the applications that print from host systems have to convert their internal document format to PostScript or PCL and then download the document to the printer using a printer driver designed to work with the specifics of the connected printer. Since there is a wide variety of printers that can be used, each with a slightly different set of features and/or bugs, a large number of printer drivers have traditionally been shipped with applications, even though end-users actually only need the printer drivers for their specific printers. Furthermore, using conventional printing techniques, an inadvertent change in the printer driver used could cause the printer to print out the commands which describe how a page is to be laid out rather than interpreting the commands and rendering a resulting image. Further, for printers which support downloadable fonts, downloading of fonts often has been restricted to downloading to the printer's RAM, ROM font cartridge or attached hard disk.

This model of application and printer driver interaction has created an increase in work performed by end-users because of the inflexibility and limited communication capability of the printer when communicating with the application.

SUMMARY OF THE INVENTION

It is an object of the present invention to overcome at least one of the deficiencies described above in the implementation of a printer language.

It is a further object of the present invention to provide a printer which uses the Java language to interpret page-layout requests.

It is another object of the present invention to provide bi-directional communication between an application or printer driver and a Java printer to enable a user to define how a page or series of pages should be laid out.

It is yet another object of the present invention to provide a World Wide Web interface to control a Java printer of the present application.

It is a further object of the present invention to use the Java-specific features of object-orientation, distribution, interpretation, security, architecture and neutrality, portability, performance, multi-threadedness, and dynamic loading to implement an improved printer.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a schematic illustration of a Web browser interface for configuring a Java printer of the present invention;

FIG. 7 is an HTML document used to identify to a Java-compatible World Wide Web browser that a queue manager applet should be loaded and run; and FIG. 8 is a schematic illustration of a class which extends the printer classes of the Java language to implement printing on letterhead.

DETAILED DESCRIPTION OF THE PREFERRED EMBODIMENTS

Figure 1:
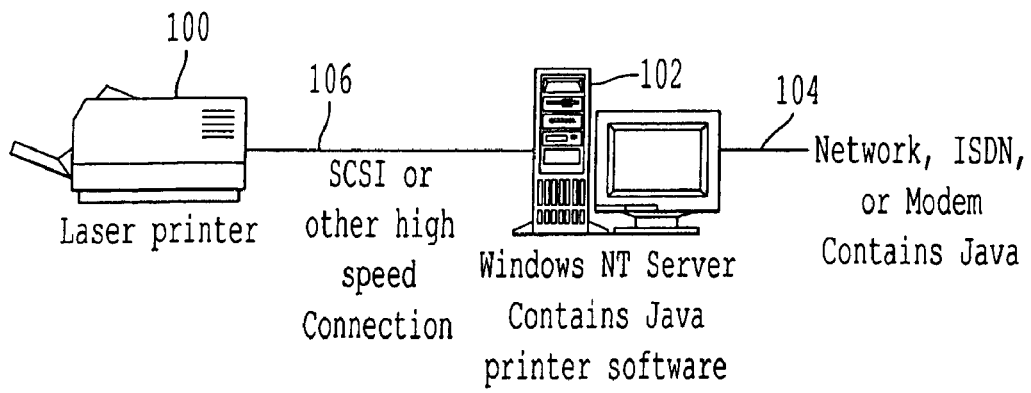
FIG. 1 is a layout diagram of a Java printer system according to a first embodiment of the invention.

Referring now to the drawings, wherein like reference numerals designate identical or corresponding parts throughout the several views, FIG. 1 is a view showing a layout of the Java printer system of the present invention. A conventional laser printer 100 is connected to a print server 102 via a high speed communication link 106 (i.e. SCSI bus), and print server 102 receives jobs via an external communication link 104 which can be a network link (Ethernet, token ring, ATM), an ISDN connection, or a modem connection. The print server 102 can be any general purpose computer system capable of running a Java interpreter, and specifically includes at least a central processing unit (CPU), random access memory (RAM), a mass storage device (i.e., a hard disk, a magneto-optical disk), an input device (i.e., mouse, keyboard, touch screen) and an output device (i.e., monitor, heads-up display, virtual reality headset). Further, the print server 102 includes any of the available commercial operating systems (i.e., UNIX, Windows 95, Windows NT, OS/2, Linux) and any other software required to implement network or Internet communications.

In the first embodiment, Java print requests are received by the print server 102 via the external communication link 104 through a socket listening on a designated port (i.e., port 80 for hypertext transfer protocol), and the print server 102 converts the received print request from a Java request to a printer request for the attached laser printer 100 in the printer language of the attached laser printer 100. The print server 102 also can receive standard hypertext transfer protocol (HTTP) requests and produce World Wide Web (WWW) pages as a result or update the configuration of the laser printer 100 if the HTTP request has been sent by a system administrator or an authorized user.

Figure 2:
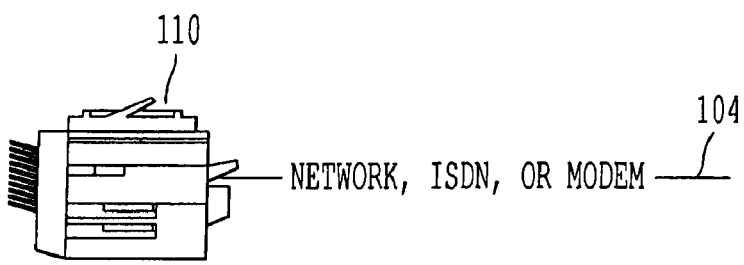
FIG. 2 is a schematic illustration of a Java printer system according to the second embodiment of the present invention.

As shown in FIG. 2, the laser printer 100, print server 102 and communication link 106 can be combined into a single network printer which is a Java printer 110 connected to the external communication link 104. In the second embodiment, the Java printer 110 receives print requests or WWW/HTTP requests directly by listening on the appropriate port. Since Java is architecture neutral, the creation of a Java printer 110 and its corresponding classes can quickly be ported or migrated to a new processor used in a new laser printer when the new processor becomes available. Further, when Java processors become available which execute Java Unicode instructions directly, the Java printer 110 can be implemented with a Java processor. Any Java printer 110 should conform to the Java Virtual Machine Specification. The Aug. 21, 1995, Release 1.0 Beta Draft version of the JVM specification is incorporated herein by reference.

Java has a rich set of graphics operators that match PostScript and PCL, and since Java is an object-oriented language which provides extensions, new complex graphics operators can be created which are subclasses of the existing graphics primitives, thereby allowing complex images to be described compactly. The present invention extends the Graphics class of the java.awt package to control drawing of images on pages, by implementing a new class, Printer. Each of the other methods of the Graphics class would likewise be implemented to allow colors and fonts to be changed and to allow lines and filled and empty polygons to be drawn. For example, calling java.awt.Printer.drawString(msg, x, y) would cause the string "msg" to be drawn on a page at position (x,y). The Printer class also would implement a function, similar to PostScript's "showpage" command, which signals that a complete page has been rendered and that the resulting image should be transferred to Java laser printer 110. Further, based on the built-in security, network capability and multi-lingual support of Java, a Java printer can handle inputs from different platforms in multiple languages and create the desired documents.

As shown in FIG. 3, a system administrator who wishes to configure a Java printer 110 can use a standard WWW browser (i.e., Netscape Navigator, Mosaic, Microsoft Navigator, IBM Web Explorer) to remotely configure the Java printer 110. The Web browser screen 120 includes a title bar 122, a menu bar 124, button icons 126, a document identifier text entry box 128 and plural additional controls such as drop box 130 which includes a list of Internet connections for which a configuration can be established. A system administrator would authenticate himself/herself to the Java printer 110 using any available security technique (i.e., Secure Socket Layer, Public Key Encryption, Symmetric Key Encryption, or a User ID and Password Hash), wherein the public key, private key or valid user ID and password hashes are stored in the non-volatile memory of the Java printer 110 or in remote local with which the Java printer 110 can communicate securely. Having authenticated himself/herself, the system administrator would choose the configure document of printer 1 as the document to be opened by specifying the appropriate URL in the text entry box 128, such as specifying:

http://printer1.companyname.com/configure.

When the Java printer 110 which was listening on the appropriate port receives the request for this document, the Java printer 110 would parse the name of the document requested from the rest of the request and determine that the system administrator wished to configure the printer for a particular user. (The complete specification for the format of an HTTP request or response can be found in the HTTP. standard (versions 1.1 or 1.0). Information on HTML can be found in Using HTML: The Definitive Guide by Musciano and Kennedy, and information on Internet information services can be found in Managing Internet Information Services by Liu et al. The contents of these references are incorporated herein by reference.) In response to a request for a document, the Java printer 110 would send back to the browser, via the socket used to send the request, a response like the page shown in FIG. 3 and referenced by reference numeral 131. The Java printer 110 also may use other information in the request to determine if the default response should be modified. The response could be modified to include text in the system administrator's native language, or similar language/cultural changes. The system administrator could then choose which user's Internet number the configuration is for by selecting an Internet number from combination box 130. As would be evident to one of ordinary skill in the art, this combination box could be replaced by a select box such that multiple configurations for multiple Internet addresses could be set simultaneously. The returned page 131 allows the system administrator to establish paper size by choosing one of the radio buttons selecting A4 paper, 8.5.times.11 paper or legal size paper. Also, the default tray is specified, allowing the system administrator to choose between letterhead paper and plain paper.

Additional values can be set, as shown in the FIG. 3 and as well as those parameters that would be evident to one of ordinary skill in the art in light of the present invention. In fact, any parameter usually set by buttons on a printer can be set through the standard WWW interface. In addition, on-line information which can not be easily displayed using LCD screens on the printer can be provided by selecting a hypertext link 134. This help information can either point to local help or remotely stored help, such as might be stored at the WWW site of the manufacturer of the Java printer 110.

Further, the Java printer 110, or the combination print server 102 and laser printer 100, can utilize the external communication link 104 dynamically to retrieve documents or portions of documents from other web sites for printing or for otherwise modifying the operation of the Java printer 110, such as loading updates to printer code. The Java printer 110 can likewise use the external communication link 104 for downloading fonts from remote locations whenever the font is needed. To download fonts, changes, or other information, the Java printer 110 can use any transfer protocol implemented by an included Java package, including HTTP, FTP, Gopher, etc. By specifying the URL from which the information should be obtained and using the java.net.getcontent( )method information can be received as a String. In addition, for new or previously unimplemented protocols, a java.net.URLConnection object would be used to receive and parse the contents of a new document type. As described earlier, this provides an advantage over PostScript printers which have to have fonts loaded in their RAM, ROM or hard disk in order to use them. Table 1 below shows some of the advantages of using Java over HP/PCL and PostScript.

TABLE I

| Network Configuration | Partially | Partially | Yes |
|---|---|---|---|
| Network Security | No | No | Yes |
| Code Size | Small | Big | Small |
| Ability to Handle Double-Byte Characters | Difficult | Difficult | Easy |
| Customization | Difficult | Difficult | Easy |
| Resources | One Location | One Location | Anywhere on the Network |
| Printer Driver | Printer Specific | Printer Specific | Universal |
| Graphics Operation | Difficult | Medium | Easy |
| Extensibility | Difficult | Difficult | Easy |
| Upgrade | Difficult | Difficult | Easy |
| Remote Diagnostics and Maintenance | Very Difficult | Very Difficult | Easy |

Figure 4:
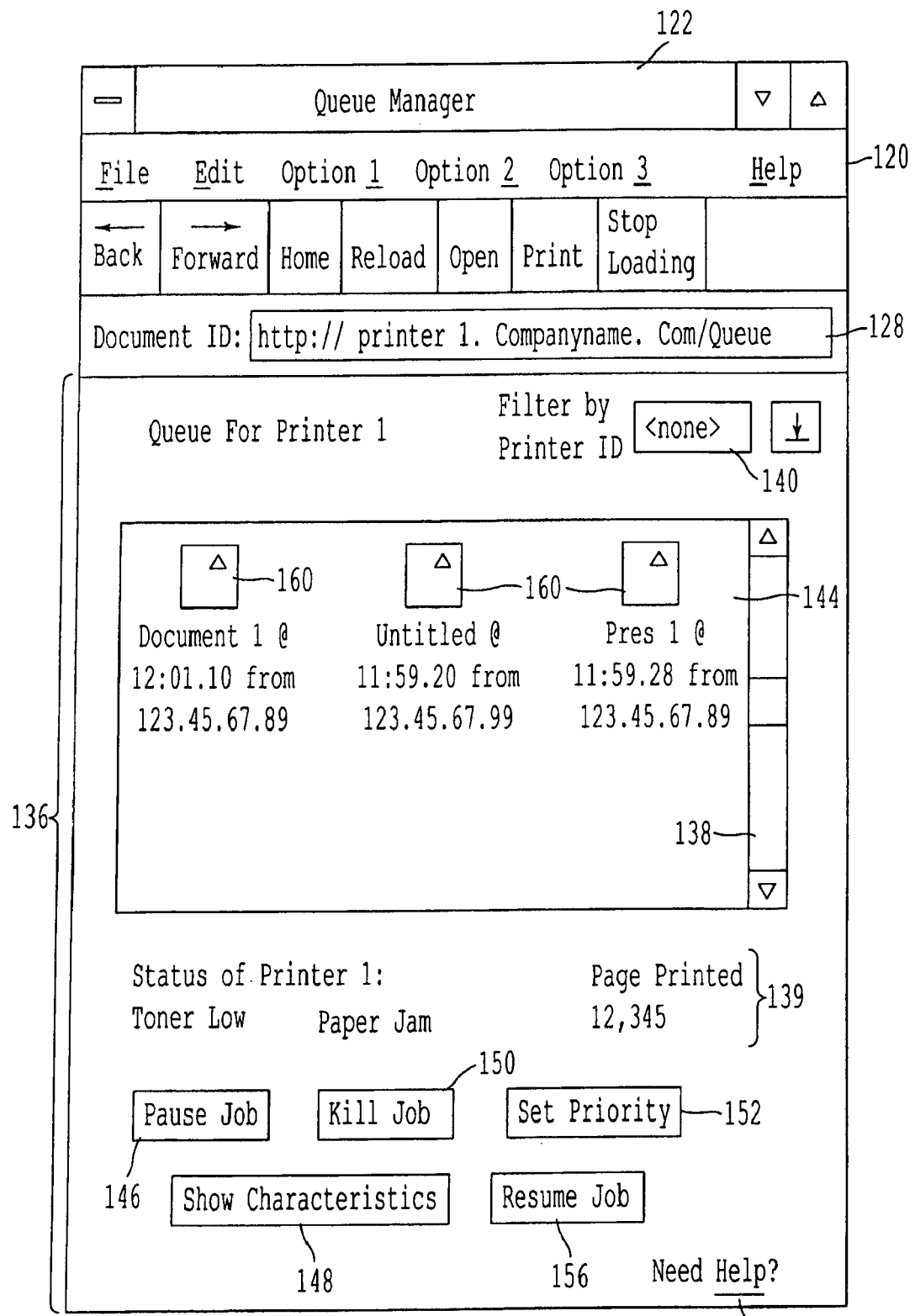
FIGS. 4 and 5 are schematic illustrations of a queue manager for controlling printing using a Java printer of the present invention.
Figure 5:
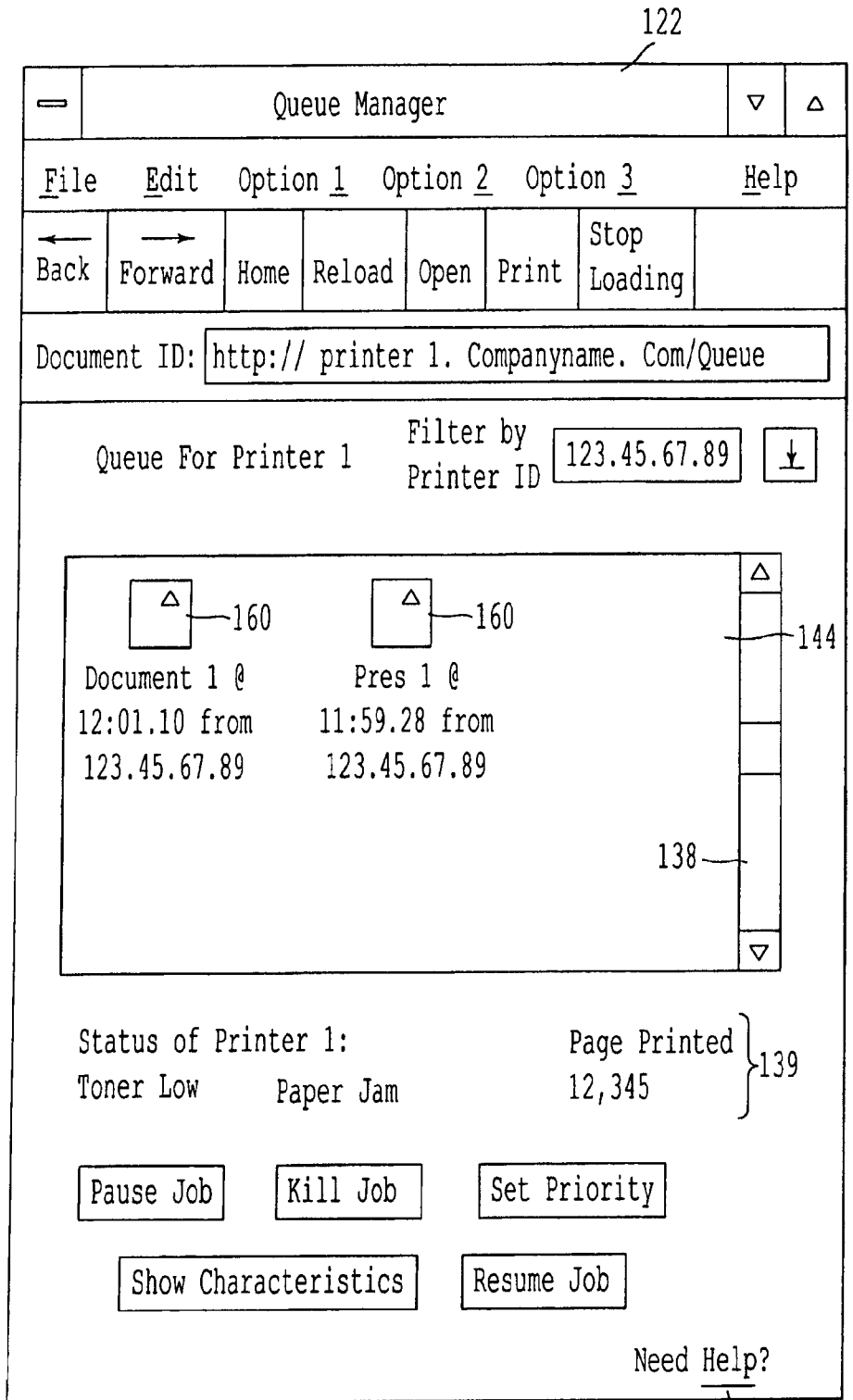

As shown in FIG. 4, the Java printer 110 can additionally be configured with a queue manager which can further control the Java printer 110 using a standard WWW interface 120. FIG. 4 shows that a system administrator has requested queue information from Java printer 110 and received back an applet which provides configuration information to the system administrator. When the system administrator uses URL:

http://printer1.companyname.com/queue, the web browser 120 changes the title bar 122 to reflect that the requested page represents the queue manager. The returned page 136 includes a series of graphics 160 which represent documents, their titles, their print times and the Internet addresses from which the jobs were submitted. These graphics 160 are displayed in a scrollable window 144 controlled by a scroll bar 138. Further, the applet includes a filter with an associated combination box 140 for filtering the graphics 160 which are displayed in the scrollable window 144. As shown in FIG. 5, when an Internet address is used as a filter, all documents not submitted by a specified Internet address (i.e., 123.45.67.89) are removed from the scrollable window 144. Referring back to FIG. 4, the applet also provides buttons 146, 148, 150, 152, and 156 which control how the Java printer 110 processes the documents. To control a print job, any of the graphics 160 can be highlighted and then one of the buttons 146, 148, 150, 152 and 156 depressed. The queue manager then will modify the queue characteristics for the highlighted job(s) according to the button which was depressed.

Since Java is multi-threaded, the Java printer 110 can multi-task between any of its functions (i.e., printing the current job, receiving a new job, pausing a job, killing a job, reordering the job such that a job is made the next job to be printed or the last job to be printed, displaying characteristics of a job, resuming a paused job, setting default configuration information or determining the status of the printer). Conventional printers perform one job at a time and do not have such a printing capability.

As shown in FIGS. 4 and 5, another advantage of a Java printer 110 is that status information 139 can be requested while other activities are being performed. Although the status information 139 is only a snapshot of the current status, the applet can periodically update the status information 139 using the network capabilities of Java and the browser provided by the DatagramPacket, DatagramSocket and Socket classes, as implemented by the java.net package. Furthermore, since the Java printer 110 performs active multi-tasking, the Java printer 110 can also periodically send status reports via to system administrators or other users by any other implemented protocol (i.e., SMTP, FTP).

Figure 6:
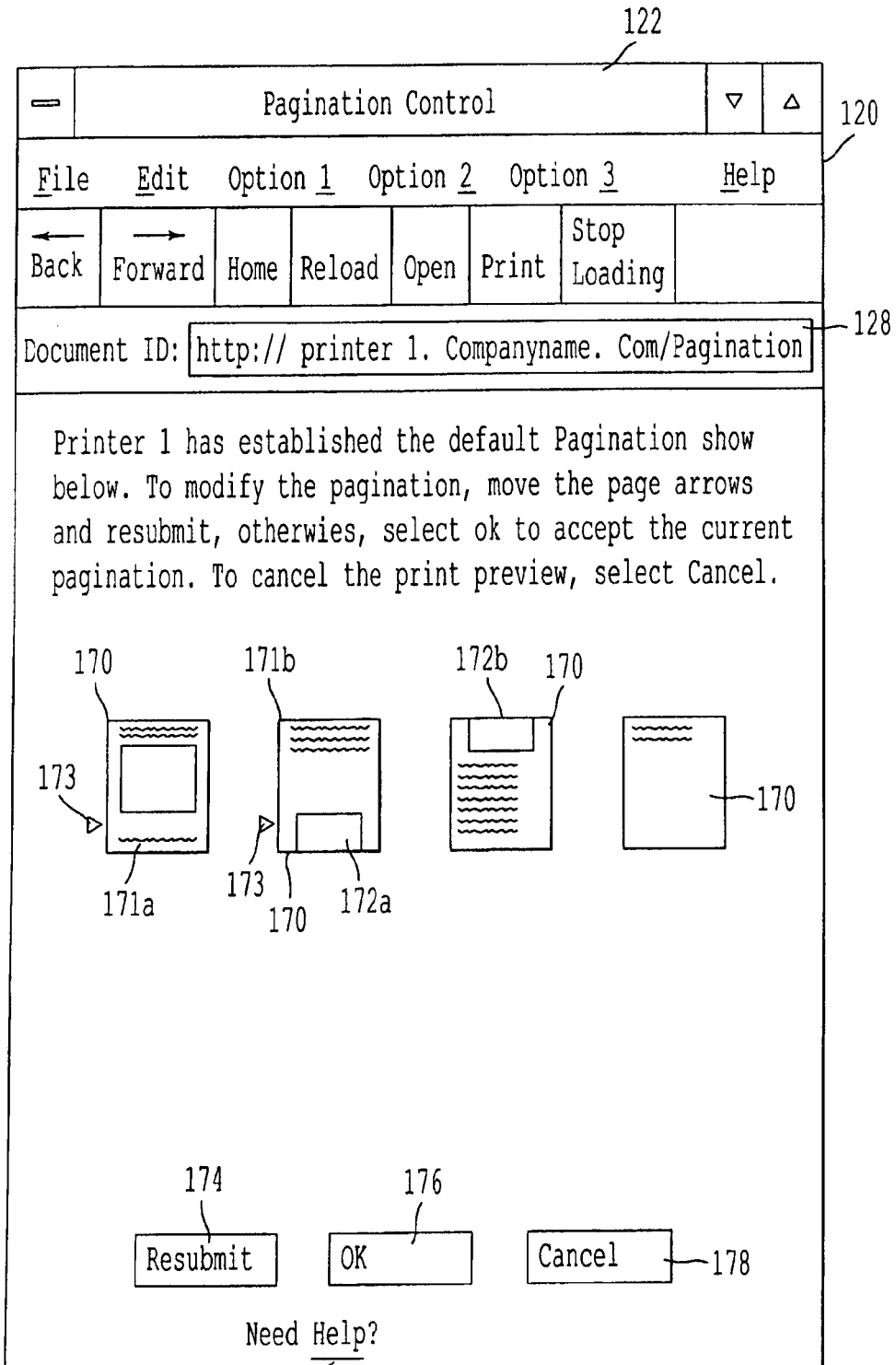
FIG. 6 is a schematic illustration of a Java applet in a Web browser that is used to control the pagination of a document sent to a Java printer.

As shown in FIG. 6, the Java printer 110 is also capable of performing interactive pagination based on an application using Java as the print language. The Java printer 110 can either be used as a traditional printer whereby the application specifies the pagination and sends print requests to the Java printer 110 in preformatted pages, or the application wishing to print uses the enhanced capabilities of the Java printer 110 to request that the Java printer 110 create a default pagination based on the characteristics of the printer.

FIG. 6 shows a document which has been paginated by a Java printer 110. Having sent Java code in the form of a WWW/HTTP request to the Java printer 110, the pagination applet, or a portion of the application written to support Java, displays the result as specified by the Java printer 110. In FIG. 6, the document has been split into four thumbnail sketches 170 which depict the layout of the document as established by the Java printer 110. The four thumbnail sketches 170 show that a figure is split across the second and third thumbnail sketches 170 into two parts 172a and 172b. Further, a paragraph of text has been split between the first and second pages, leaving a single line 171a separate from the rest of the text 171b. To modify the default pagination, the application places page arrows 173 next to the thumbnail sketches 170 to indicate where the user wishes the pagination to actually occur. Using page arrows 173, the single line of text of 171*a* can be grouped with the rest of the text 171*b*, and the image 172*a* and 172*b* can be grouped. When the user has set the page arrows 173, the user uses the Resubmit button 174 to send the new configuration Java printer 110 which recreates thumbnail sketches 170 and returns the new result to web browser or pagination output/application. If the thumbnail sketches 170 were satisfiable to the user, the Ok button 176 would be used to signal that the pagination has been accepted by the user and that the pages should be printed. In addition, the Cancel button 178 can be depressed if the user wishes to cancel the printing. This allows the Java printer 110 to clear the Java print request from the pending queue of outstanding paginations. By explicitly clearing this information, the garbage collection process of the Java interpreter can reclaim the memory of the Java printer 110 more quickly. Although FIG. 6 has been described in terms of page arrows 173, any type of pagination identifier could be used to describe how pages should be repaginated. For example, a continuous, scrollable image could be presented, and the user would use the applet/application to draw lines where the pagination should be. Furthermore, the standard hard return tag of HTML, <HR>, can be used in an alternate embodiment to show where page breaks occur. In addition, the thumbnail sketches 170 can be any type of graphic that can be displayed on a page 120. These graphics include thumbnail GIFs, Java images, etc., several of which are supported by the java.image package.

As shown in FIG. 7, the applet of FIGS. 4 and 5 can be generated using standard HTML code with a browser which supports Java. Using the APPLET keyword, the browser knows to load the queue manager class and display the window with a width of 500 and a height of 300.

As shown in FIG. 8, the Java printer 110 can be extended with new classes such as the Letterhead class of FIG. 8. The Letterhead class extends the printing class which provides the base printing functionality of the present invention. Although the Letterhead class shown is not completely illustrated, it would be evident to one of ordinary skill in the art that the Letterhead class would be used to first print the letterhead text onto a page to be printed, and then the Print class would perform its printing of the rest of the page. The illustrative class allows the printing on two types of letterhead, cover sheets and everything else, by specifying different strings and positions for the two pages. The Letterhead class could be extended in an alternate embodiment to use arrays, as supported by the Java language, to allow multiple strings and positions to be stored for each letterhead page.

Furthermore, to smooth the transition from PostScript and PCL to Java, Java printers can be implemented which utilize subclasses of the Printer class that receive and render PostScript, PCL or both. These classes can even be added dynamically by the system administrator when they become available. The new classes would be loaded using a URL specified by the system administrator. On the other hand, traditional printer drivers which utilize GDI calls can be modified to generate Java code from the received GDI. application. For example, since windows documents are generated using standard GDI calls, a Java printer 110 can be selected like any other supported printer, and the Java printer driver then would convert the Windows GDI calls into Java code to be sent to the Java printer 110.

Obviously, numerous modifications and variations of the present invention are possible in light of the above teachings without departing from the intended scope of the present invention. Such changes include storing the user profile information in remote databases rather than in the Java printer 110 itself. By using the Java SQL API, also known as the JDBC, remote databases can store the user profile information, and applets still can query and update the user profile information. Since the JDBC specification has not been finalized, the version 0.70 draft specification dated May 7, 1996 is incorporated herein by reference.

The invention claimed is:

1. An image forming device, comprising:
   a memory configured to store identification data;
   an interface configured to send an authentication interface to a computer, wherein the authentication interface is a Java application;
   the interface configured to receive authentication data from the computer;
   a processor configured to perform authentication based on the stored identification data and the authentication data received from the computer;
   the interface configured to send a control interface to the computer based on the result of the authentication;
   the interface configured to receive, from the computer, a printer control parameter; and
   the processor configured to update a control memory of the image forming device based on the printer control parameter.

2. The image forming device of claim 1, wherein the printer control parameter corresponds to a paper size.

3. The image forming device of claim 1, wherein the printer control parameter corresponds to tray selection.

4. The image forming device of claim 1, wherein the printer control parameter corresponds to an image type.

5. The image forming device of claim 1, wherein the printer control parameter corresponds to a language used in an interface transmitted from the image forming device to the computer.

6. A method of managing a configuration of an image forming device, the method comprising:
   storing, by a memory of the image forming device, identification data;
   sending, by an interface of the image forming device, an authentication interface to a computer, wherein the authentication interface is a Java application;
   receiving, by the interface of the image forming device, authentication data from the computer;
   performing, by a processor of the image forming device, authentication based on the stored identification data and the authentication data received from the computer;
   sending, by the interface of the image forming device, a control interface to the computer based on the result of the authentication;
   receiving, by the interface of the image forming device from the computer, a printer control parameter; and
   updating, by the processor of the image forming device, a control memory of the image forming device based on the printer control parameter.

7. The method of claim 6, wherein the printer control parameter corresponds to a paper size.

8. The method of claim 6, wherein the printer control parameter corresponds to tray selection.

9. The method claim 6, wherein the printer control parameter corresponds to an image type.

10. The method of claim 6, wherein the printer control parameter corresponds to a language used in an interface transmitted from the image forming device to the computer.

11. A non-transitory computer-readable medium including computer program instructions, which when executed by an image forming device, cause the image forming device to perform a method of managing a configuration of the image forming device, the method comprising:
  storing identification data;
  sending an authentication interface to a computer, wherein the authentication interface is a Java application;
  receiving authentication data from the computer;
  performing authentication based on the stored identification data and the authentication data received from the computer;
  sending a control interface to the computer based on the result of the authentication;
  receiving a printer control parameter from the computer; and
  updating a control memory of the image forming device based on the printer control parameter.

12. The non-transitory computer-readable medium of claim 11, wherein the printer control parameter corresponds to a paper size.

13. The non-transitory computer-readable medium of claim 11, wherein the printer control parameter corresponds to tray selection.

14. The non-transitory computer-readable medium of claim 11, wherein the printer control parameter corresponds to an image type.

15. The non-transitory computer-readable medium of claim 11, wherein the printer control parameter corresponds to a language used in an interface transmitted from the image forming device to the computer.

* * * * *